(12) United States Patent
Schumann et al.

(10) Patent No.: US 10,125,851 B2
(45) Date of Patent: Nov. 13, 2018

(54) SPINDLE-ROTOR UNIT

(71) Applicant: Schaeffler Technologies AG & Co. KG, Herzogenaurach (DE)

(72) Inventors: Lars Schumann, Buehl (DE); Lazlo Man, Ottersweier-Unzhurst (DE); Peter Greb, Ottersweier (DE); Alexander Dreher, Sinzheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/038,685

(22) PCT Filed: Nov. 3, 2014

(86) PCT No.: PCT/DE2014/200614
§ 371 (c)(1),
(2) Date: May 23, 2016

(87) PCT Pub. No.: WO2015/078463
PCT Pub. Date: Jun. 4, 2015

(65) Prior Publication Data
US 2016/0290455 A1 Oct. 6, 2016

(30) Foreign Application Priority Data
Nov. 27, 2013 (DE) .......................... 10 2013 224 271

(51) Int. Cl.
*F16H 25/22* (2006.01)
*F16H 25/20* (2006.01)
*F16H 25/24* (2006.01)
(Continued)

(52) U.S. Cl.
CPC ......... *F16H 25/2252* (2013.01); *F16D 23/12* (2013.01); *F16H 25/20* (2013.01);
(Continued)

(58) Field of Classification Search
CPC ............. F16H 25/2252; F16H 25/2472; F16H 25/2015; F16H 25/24; F16H 25/20;
(Continued)

(56) References Cited

U.S. PATENT DOCUMENTS 3,464,164 A * 9/1969 Blohm ...................... B23Q 5/58
254/103
4,926,708 A 5/1990 Dietrich et al.
(Continued)

FOREIGN PATENT DOCUMENTS

DE 277308 A5 3/1990
DE 102010039916 3/2011
(Continued)

*Primary Examiner* — David J Hlavka
(74) *Attorney, Agent, or Firm* — Davidson, Davidson & Kappel, LLC

(57) ABSTRACT

A spindle drive unit, in particular for an actuator having a planetary screw drive (PWG) for actuating a clutch of a motor vehicle by an actuating element is provided, where the drive unit has an e-motor with a rotor and a stator and where a spindle provided with a pitch is connected non-rotatingly to the rotor and is drivable by the rotor around an axis of rotation. The spindle is designed as a threaded rod and a rotor carrier that holds the rotor is screwed onto the threaded rod, and the rotor carrier is rotationally secured and axially fixed on the spindle by a lock nut.

16 Claims, 4 Drawing Sheets

(51) Int. Cl.
*H02K 7/06* (2006.01)
*F16D 23/12* (2006.01)

(52) U.S. Cl.
CPC ......... *F16H 25/2015* (2013.01); *F16H 25/24* (2013.01); *F16H 25/2472* (2013.01); *H02K 7/06* (2013.01); *F16D 2023/123* (2013.01); *F16H 2025/2075* (2013.01)

(58) Field of Classification Search
CPC ............. F16H 2025/2075; F16D 23/12; F16D 2023/123; H02K 7/06
See application file for complete search history.

(56) References Cited

U.S. PATENT DOCUMENTS

| | | | |
|---|---|---|---|
| 6,079,287 A * | 6/2000 | Nagata | F16H 25/20 74/586 |
| 7,064,464 B2 | 6/2006 | Ickinger | |
| 9,051,974 B2 | 6/2015 | Gramann et al. | |
| 2006/0091762 A1* | 5/2006 | Haneball | F16H 25/20 310/309 |
| 2011/0068725 A1* | 3/2011 | Bastholm | F16H 25/2015 318/468 |
| 2012/0160043 A1 | 6/2012 | Drumm | |
| 2012/0217117 A1* | 8/2012 | Gramann | F16D 29/005 192/83 |

FOREIGN PATENT DOCUMENTS

| | | |
|---|---|---|
| DE | 10 2010 047 800 A1 | 5/2011 |
| DE | 102012214552 | 3/2013 |
| EP | 320 621 A1 | 6/1989 |
| EP | 2056430 | 5/2009 |
| WO | WO03/011562 | 2/2003 |

\* cited by examiner

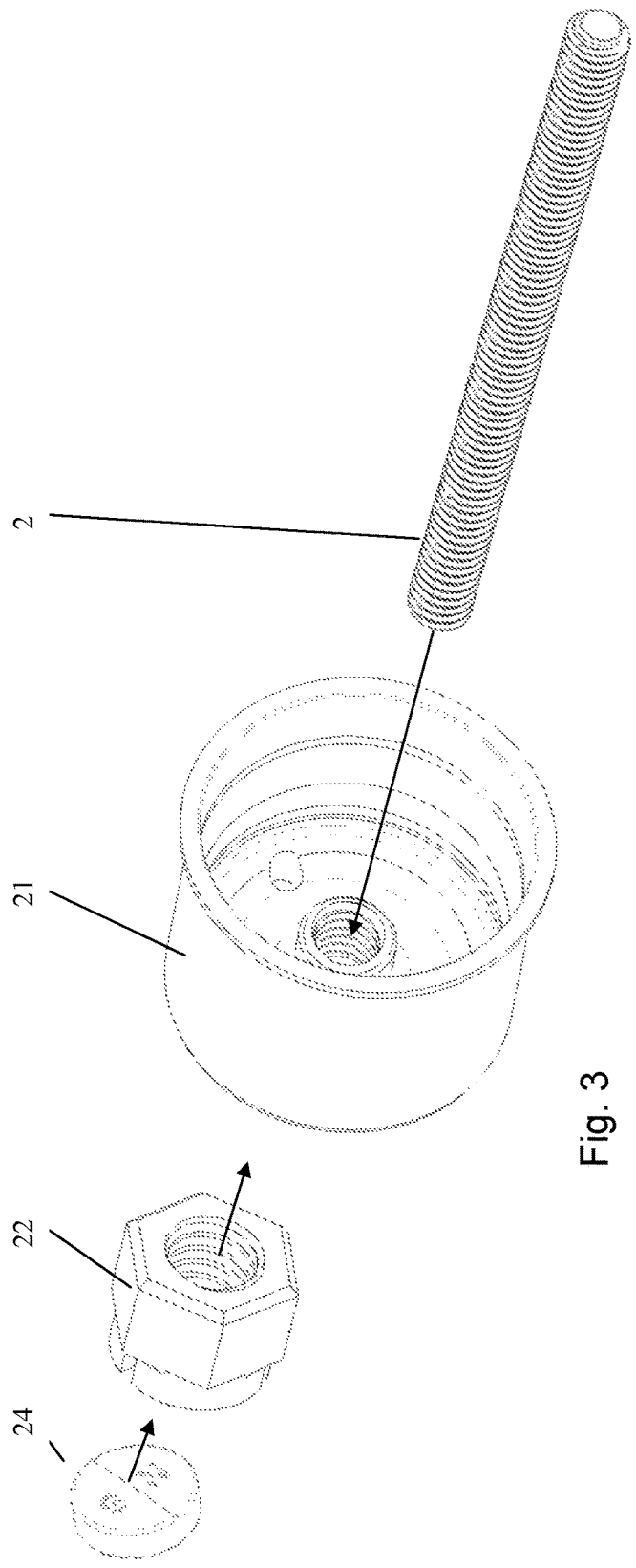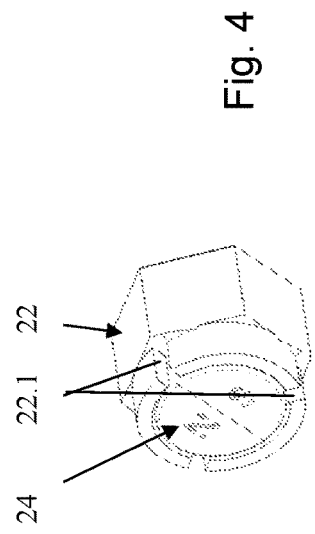
Fig. 3
Fig. 4

SPINDLE-ROTOR UNIT

The invention relates to a spindle-rotor unit, in particular for an actuator having a planetary screw drive (PWG).

BACKGROUND

Planetary screw drives (PWGs) (also referred to as rolling planetary screw drives) have been the state of the art for many years, and are described for example in DD 0277308 A5. A planetary screw drive is known, for example, from published patent DE 10 2010 047 800 A1, which is contained in a hydrostatic actuator in the form of a hydrostatic clutch actuator in order to convert a rotary motion produced by means of an electric motor to an axial motion.

From a heretofore unpublished application, rolling planetary transmissions for use in an actuator are also known. Here, a rotor of an e-motor (electric motor) is connected non-rotatingly to a spindle of a PWG. At the same time, the spindle nut of the PWG is secured against turning, in order to guarantee an axial motion which ultimately results in a piston stroke of the actuator. The position of the piston can be determined using sensor technology that is integrated into the disengaging system. To that end, the position of an electrically conductive object that is to be detected (target) is ascertainable using an inductive sensor that is fixed relative to the housing, the target being integrated into the piston or into a component of the disengaging system which is movable axially complementarily to the piston, or being shaped in the form of at least one region of a component that is movable complementarily to the piston. This solution turns out to be very expensive.

A device for converting a rotary motion into an axial motion, having a threaded spindle with a nut that encircles the screw spindle and is rotatable relative to the latter, with inside profiling and with a number of profiled rolling elements positioned in between, is also known from publication EP 320 621 A1. The threaded spindle has single-course or multi-course fine threading on its outside, and the inner profiling of the nut, which is rotatable relative to the threaded spindle, is executed in the form of relatively coarse grooves. In addition, a covering is provided on both sides, which serves to secure the rollers.

Furthermore, it is also known to connect a rotor of a drive to a spindle by means of a compression connection or in some other way so that it cannot turn.

Disadvantages here are the high construction expense and the sometimes expensive assembly.

SUMMARY OF THE INVENTION

The object of the present invention consists in developing a spindle-rotor unit, in particular for an actuator having a planetary screw drive (PWG), which can be constructed simply and inexpensively.

The spindle drive unit is employed in particular for an actuator having a planetary screw drive (PWG) for actuating a clutch of a motor vehicle by means of an actuating element, where the drive unit has an e-motor with a rotor and a stator and where a spindle provided with a pitch is connected non-rotatingly to the rotor and is drivable by the rotor around an axis of rotation, and according to the invention the spindle is designed as a threaded rod and a rotor carrier that holds the rotor is screwed onto the threaded rod, and the rotor carrier is rotationally secured and axially fixed on the spindle by means of a lock nut.

This produces a constructively simple and cost-effective variant of the production of a rotationally fixed and axially secured connection between spindle and rotor.

The lock nut is preferably screwed against the rotor carrier on the side of the spindle opposite the piston.

Between the rotor carrier and the lock nut an intermediate plate may be positioned, which prevents or reduces a possible pre-stress loss between the rotor carrier and the lock nut due to settling effects or the like.

To that end, a spring accumulator that works in the axial direction, which is combined with the intermediate plate or forms the intermediate plate, may be located between the rotor carrier and the lock nut.

Furthermore, a signal generator may be located on the lock nut and/or the intermediate plate and/or the spring accumulator.

This makes it very easy to position and integrate the signal carrier.

In an advantageous configuration, the lock nut is designed as a self-clamping nut, so that it is secured in addition against unintended loosening.

As standard according to the prior art, the stator of the motor of the spindle drive unit is held on a frame-fixed stator carrier, and the rotor carrier which holds the rotor of the drive is supported rotatingly on the stator carrier by means of a bearing having an inner ring and an outer ring. For the first time, the bearing is fastened onto the bearing carrier after being installed on the stator carrier by reshaping an area of the bearing carrier, which produces a very simple attachment possibility.

The rotor carrier has a first region extending axially, which is provided with inside threading and is screwed onto the spindle. Adjacent to this first region on the side of the lock nut is a region that extends radially, against which the lock nut is screwed, and which is adjoined at a radial interval from the axially extending first region by an axially extending second region, so that an annular space is formed between the first and second regions, which is engaged by the bearing of the stator carrier carrying the stator. The coupling of bearing carrier, stator carrier and bearing takes place in a first variant, by the bearing being operationally connected by its bearing inner ring non-rotatingly to the stator carrier and secured axially by the reshaped region, and being operationally connected by its bearing outer ring non-rotatingly to the second region of the rotor carrier and secured axially, or in a second variant, by the bearing being operationally connected by its bearing inner ring non-rotatingly to the first region of the rotor carrier and axially secured, and being operationally connected by its bearing outer ring non-rotatingly to the stator carrier and secured axially by the reshaped region, while the bearing is operationally connected by a bearing outer ring non-rotatingly to the second region of the rotor carrier and secured axially, and to that end has a securing element located in the bearing outer ring which can be deformed radially inward during assembly and snaps into a groove in the second region of the rotor carrier.

In the first variant, the bearing inner ring rests against a flange of the bearing carrier axially, and is fixed axially in the direction of the lock nut with a radially outward reshaped region of the stator carrier. A securing element located in the bearing outer ring (AR), which preferably sits in a groove of the bearing outer ring and is deformable radially inward, snaps into a groove of the rotor carrier after assembly and fixes the bearing outer ring axially on the rotor carrier.

In the second variant, the bearing inner ring is clamped axially against the first region of the rotor carrier in the direction of the lock nut by a bearing fastening nut and thus is fixed axially, and the bearing outer ring rests axially in the direction of the lock nut on a region of the stator carrier that is bent inward, and facing axially away from the lock nut is fixed axially by a region/flange of the stator carrier that is reshaped radially inward after the bearing is mounted on the stator carrier.

The reshaping of the bearing carrier to fix the bearing axially after it has been pushed on is carried out, for example, by beading or peening.

The solution according to the invention produces an efficient and assembly-friendly spindle drive unit, which is usable in particular for an actuator having a planetary screw drive (PWG) for actuating a clutch of a vehicle by means of an actuating element.

BRIEF DESCRIPTION OF THE DRAWINGS

The invention will be explained in greater detail below on the basis of an exemplary embodiment with corresponding drawings.

The figures show the following.

DETAILED DESCRIPTION

Figure 1:
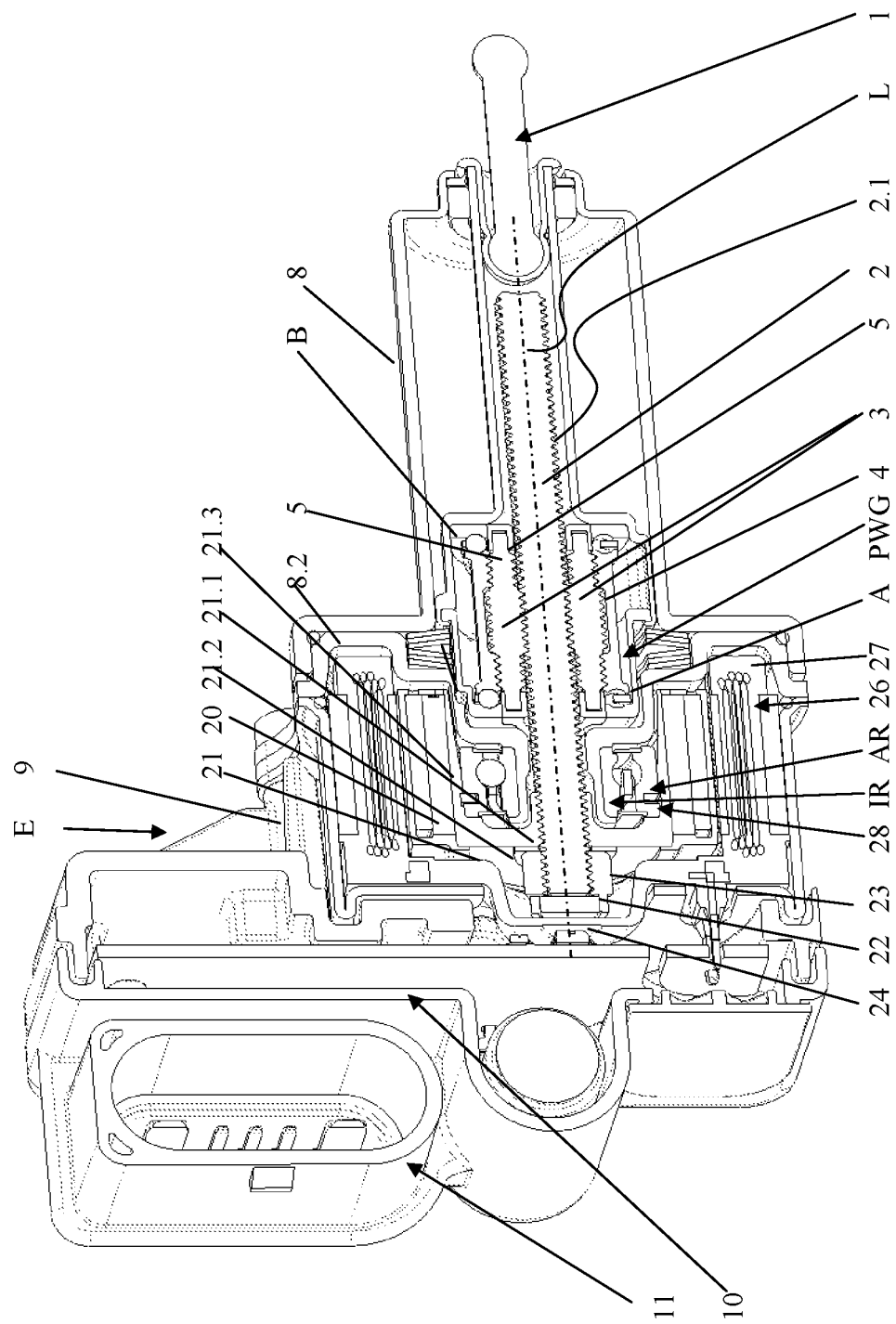
FIG. 1 a longitudinal section of an actuator employing the solution according to the invention, FIG. 2 the longitudinal section of a connection between spindle and rotor carrier, FIG. 3 a three-dimensional exploded depiction according to FIG. 1, FIG. 4 the lock nut with integrated signal generator, FIG. 5 a longitudinal section of the first variant of the attachment of the bearing between rotor carrier and stator carrier, FIG. 6 a longitudinal section of the second variant of the attachment of the bearing between rotor carrier and stator carrier.

FIG. 1 shows an actuator in longitudinal section, which has a planetary screw drive (PWG) with which the rotary motion produced by an electric motor E is converted to an axial stroke motion whereby a piston 1 can advance and a clutch (not shown) can be actuated thereby. The transmission in the form of a planetary screw drive PWG has a spindle 2 having outside threading 2.1 with a pitch, which is connected non-rotatingly to a motor of the drive (in this case e-motor E) and is drivable by the electric motor E around an axis of rotation L. The spindle 2 engages a plurality of planetary rollers 3, which mesh with a ring gear 4 that encircles the planetary rollers 3. Preferably three or a multiple of three planetary rollers 3 are positioned around the spindle in the circumferential direction. The planetary rollers 3 are held rotatingly at each of their two ends in a planetary roller carrier 5, the two planetary roller carriers 5 being supported non-rotatingly in a first sleeve A.

The first sleeve A sits non-rotating and axially fixed in a second sleeve B, which is movable axially along a guideway in a housing 8 and is sealed relative to the latter. The housing 8 is fastened firmly to the frame of the motor housing 9 of the electric motor E through a flange area 8.2 which faces radially outward.

Also placed in the motor housing 9 are the requisite electronics 10, and interfaces to the outside are provided, such as plugs 11, flange points, etc.

The electric motor E located in the motor housing 9 has a rotor 20, which is held non-rotatably on a rotor carrier 21, the rotor carrier 21 having an unspecified threading on its inside diameter and being screwed together with the outside threading 2.1 of the spindle 2. The spindle 2 is designed as a threaded rod. The rotor carrier 21 is screwed onto the spindle 2 on the side of the spindle 2 opposite the piston 1, and is secured against turning and fixed axially by means of a lock nut 22.

Positioned between rotor carrier 21 and lock nut 22 is an intermediate plate 23 in the form of a spring accumulator, which prevents or reduces a possible pre-stress loss between rotor carrier 21 and lock nut 22 due to settling effects. Furthermore, a signal generator 24 is inserted into the lock nut 22. The rotor carrier 21 has a first region 21.1 extending axially, which is provided with the inside threading and is screwed onto the spindle. Adjacent to the first region 21.1 on the side of the lock nut 22 is a radially extending region 21.2, followed at a radial interval from the axially extending region 21.1 by an axially extending second region 21.3, so that an annular space 25 (see FIG. 2) is formed between the first region 21.1 and the second region 21.3.

Figure 6:
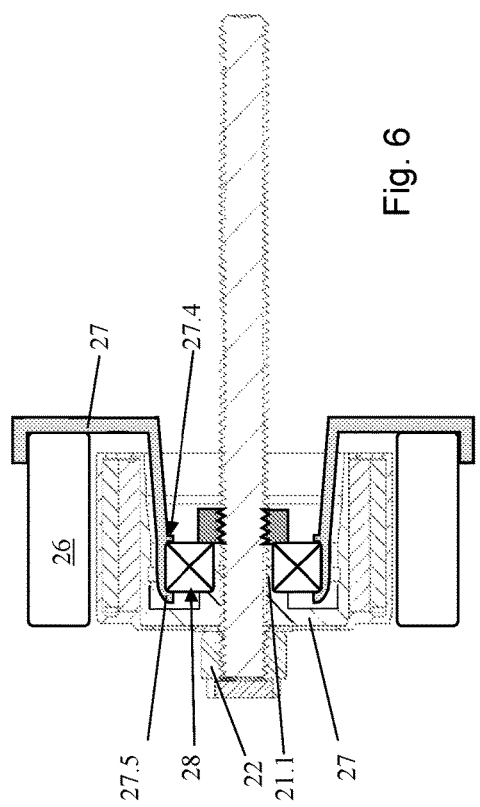

The stator 26 is held on a frame-fixed stator carrier 27, which is preferably formed by a formed sheet metal part, and the rotor carrier 21 is rotatably supported on the stator carrier 27 by means of a bearing 28 having an inner ring IR and an outer ring AR, the bearing 28 being fastened here by its inner ring to the stator carrier 27 by a reshaped region of the latter so that it is axially fixed and non-rotating (see FIG. 6) and the outer ring AR of the bearing 28 being fastened to the axially extending second region 21.3 of the rotor carrier so that it is non-rotating and axially fixed (see FIG. 6).

Figure 2:
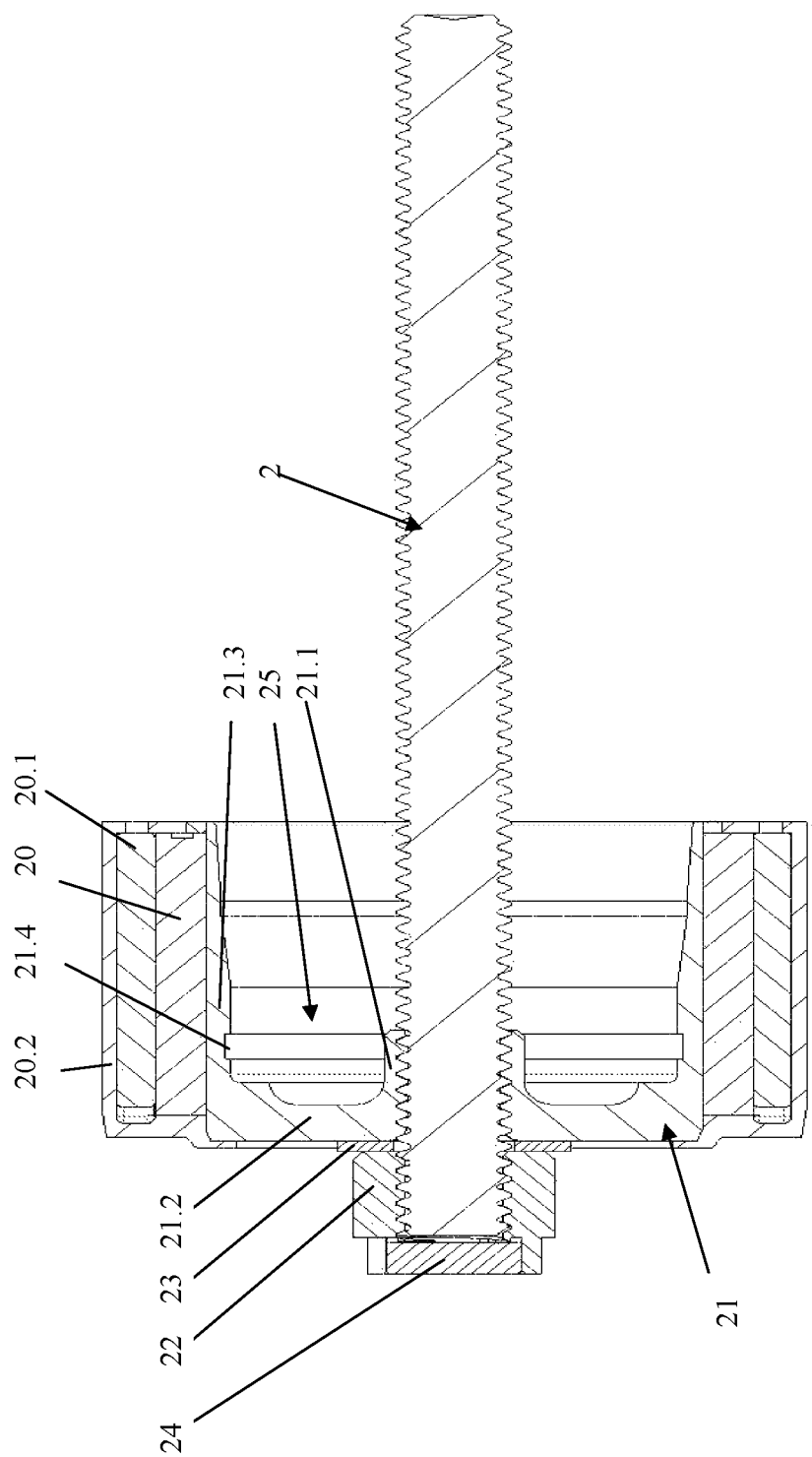

FIG. 2 depicts the components of the spindle drive unit, which ensure a non-rotating and axially fixed connection between spindle 2 and rotor carrier 21. The rotor carrier 21 is screwed onto the spindle 2 by its inside threading (not shown), and is secured on the spindle by means of a lock nut 22 so that it is axially fixed and cannot turn. Positioned between the rotor carrier 21 and the lock nut 22 is the intermediate plate 23. A signal generator 24 is inserted into an outward-facing recess 22.1 of the lock nut 22. It can be seen from FIG. 2 that the rotor carrier 21 has an axially extending first region 21.1 which is provided with the inside threading and is screwed onto the spindle, that the first region 21.1 is adjoined on the side of the lock nut 22 by a radially extending region 21.2, against which the lock nut 22 acts, and followed at a radial interval from the axially extending region 21.1 by an axially extending second region 21.3. Between the first region 21.1 and the second region 21.3, an annular space 25 is formed. On the inside contour of the radially extending second region 21.3 an encircling groove 21.4 is provided, and on the outside diameter of the axially extending second region 21.3 of the bearing carrier 21 sits non-rotating and axially fixed the rotor 20, into which magnets 20.1 are integrated and provided with a sheathing 20.2.

From FIG. 3 the exploded depiction of the components depicted in FIG. 2 can again be seen (without an intermediate plate). The signal generator 24 is inserted into a recess in the lock nut 22. The rotor carrier 21 is screwed onto the spindle 2 so that the spindle 2 protrudes through the rotor 21. The lock nut 22 is then screwed onto the region of the spindle protruding through the rotor carrier, until it is clamped firmly against the rotor carrier and secures the latter against turning relative to the spindle 2.

From FIG. 4 it can be seen that the lock nut 22 has a recess in which the signal generator 24, here in the form of a disk-shaped magnet, sits; to that end, the walls of the nut between which the recess extends are provided with axially running slits 22.1, which ensure that the magnet is pressed in.

Figure 5:
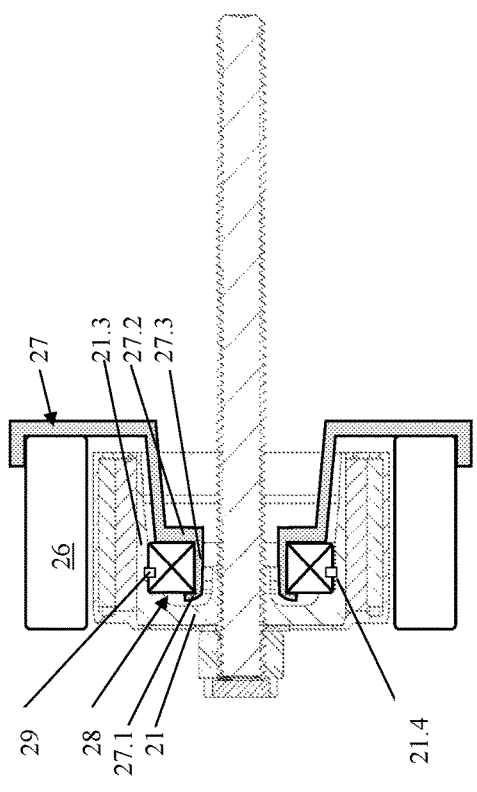

FIGS. 5 and 6 depict schematically two variants of the articulation of the bearing 28 of a stator carrier 27 that holds the stator 26; the bearing outer ring and bearing inner ring are not designated and depicted separately.

In a first variant shown in FIG. 5 (see also FIG. 1) the bearing 24 is fixed by its bearing inner ring non-rotatingly on the stator carrier 27 and fixed axially by a first reshaped region 27.1. On the other face, the bearing inner ring hits a radially extending flange 27.2 of the stator carrier 27, and sits with its inside diameter on a radially extending ring-shaped region 27.3 of the stator carrier 27.

The bearing outer ring sits with its outside diameter non-rotatingly in the axially extending second region 21.3 or the rotor carrier 21. It is secured axially by a securing element 29 located in the bearing outer ring, which securing element 29 can become deformed radially inward during assembly and snaps into the groove 21.4 in the rotor carrier 21 and thus ensures axial securing between the rotor-spindle unit and the stator carrier 27.

In the variant depicted in FIG. 6, the bearing 28 is connected non-rotatingly by its bearing inner ring to the first axially extending region 21.1 of the rotor carrier 21, and is clamped and thus secured axially by a bearing fastening nut.

The bearing outer ring is operationally connected to the stator carrier 27 non-rotatingly and secured axially by a second reshaped region 27.4. In the direction of the lock nut 22, the stator carrier 27 has an edge region 27.5 bent radially inward, which secures the bearing 28 axially in the direction of the lock nut 22. After the bearing 28 is mounted on the stator carrier 27, the second reshaped region 27.4 is produced by peening, whereby the bearing outer ring of the bearing 28 is pressed against the edge region 27.5 and a zero-clearance attachment of the bearing on the stator carrier 27 is realized.

According to a non-illustrated exemplary embodiment, it is possible to realize a second bearing point by means of an axial guide of a nut/PWG located on the spindle, which is supported in the circumferential direction in the housing. The spindle should preferably be operated as a pull element, but push loading is also conceivable.

With the solution according to the invention, besides the non-rotating and axially fixed connection between the spindle 2 and the rotor carrier 21, a simple and reliable positioning of the bearing 28 between the stator 26 and the rotor 20 is also realized.

With the present invention, an inexpensive connection between spindle 2 and rotor 20 is realizable. The spindle 2 needs to be designed only as a normal threaded rod. The rotor 20 or a rotor carrier 21 of the e-motor is screwed onto this threaded rod 2. The lock nut 22 is then screwed onto the side of the spindle 2 opposite the piston 1 to connect the rotor carrier 21 non-rotatingly. In addition, a spring/spring element can also be provided between rotor carrier 21 and lock nut 2 as a pre-load. If the lock nut 22 also functions at the same time as the holder of a sensor element/signal generator 24, for example in the form of a magnet/sensor position magnet, synergy effects can be used here. The electronics 10 of the actuator are then in immediate proximity to the sensor position magnet.

REFERENCE LABELS 1 piston
2 spindle
2.1 outside threading
3 planetary rollers
4 ring gear
5 planetary roller carrier
8 housing
8.2 flange region
9 motor housing
10 electronics
11 connector plug
20 rotor
20.1 magnets
20.2 sheathing
21 rotor carrier
21.1 first radially extending region of the rotor carrier
21.2 radially extending region of the rotor carrier
21.3 second radially extending region of the rotor carrier
21.4 groove
22 lock nut
22.1 slits
23 intermediate plate
24 signal generator
25 annular space
26 stator
27 stator carrier
27.1 first unshaped region
27.2 flange
27.3 ring-shaped region
27.4 second reshaped region
27.5 edge region
28 bearing
29 securing element
30 bearing fastening nut

The invention claimed is:

1. A spindle drive unit comprising:
an e-motor with a rotor and a stator;
a spindle provided with a pitch and connected non-rotatingly to the rotor, the spindle drivable by the rotor around an axis of rotation, the spindle including a threaded rod; and
a rotor carrier holding the rotor and screwed onto the threaded rod, the rotor carrier being rotationally secured and axially fixed on the spindle via a lock nut.

2. The spindle drive unit as recited in claim 1 further comprising a piston axially movable by the e-motor via the spindle, wherein the lock nut is screwed onto a side of the spindle opposite the piston to connect the rotor carrier non-rotatingly.

3. The spindle drive unit as recited in claim 1 further comprising an intermediate plate positioned between the rotor carrier and the lock nut.

4. The spindle drive as recited in claim 3 further comprising, between the rotor carrier and lock nut, a spring accumulator operating in the axial direction, the spring accumulator being combined with the intermediate plate.

5. The spindle drive as recited in claim 3 wherein the intermediate plate is a spring accumulator.

6. The spindle drive unit as recited in claim 1 further comprising a signal generator indirectly or directly fixed to the lock nut.

7. The spindle drive unit as recited in claim 1 wherein the lock nut is designed as a self-clamping nut.

8. The spindle drive unit as recited in claim 1 wherein the stator is held on a frame-fixed stator carrier and the rotor carrier is supported rotatingly on the stator carrier via a bearing having an inner ring and an outer ring, the bearing being fastened on the stator carrier by a reshaped region of the stator carrier.

9. The spindle drive unit as recited in claim 8 wherein the rotor carrier has an axially extending first region provided with inner threading and screwed onto the spindle, the first region being adjoined on a side of the lock nut by a radially extending region, followed at a radial interval from the axially extending first region by an axially extending second region, so that between the first region and the second region an annular space is formed, the stator carrier carrying the stator engaging the annular space of the rotor carrier with the bearing.

10. A motor vehicle comprising a clutch and the spindle drive unit as recited in claim 1, the spindle drive unit being for an actuator having a planetary screw drive for actuating the clutch.

11. The spindle drive unit as recited in claim 1 wherein the threaded rod includes a threaded outer surface, the rotor carrier being screwed onto the threaded outer surface.

12. The spindle drive unit as recited in claim 11 wherein the lock nut is screwed onto the threaded outer surface at a same end of spindle as the rotor carrier.

13. The spindle drive unit as recited in claim 12 wherein the threaded rod includes a first axial end received in the lock nut and a second axial end opposite of the first axial end, the spindle drive unit further comprising a gear engaging the threaded outer surface axially between the lock nut and the second axial end, the electric motor being configured for axially moving the gear on the threaded rod via the rotor carrier.

14. The spindle drive unit as recited in claim 6 wherein the signal generator is directly fixed to the lock nut.

15. The spindle drive unit as recited in claim 1 wherein the rotor carrier includes a radially inner axially extending first region contacting a threaded outer surface of the threaded rod, a radially outer axially extending second region and a radially extending region connecting the axially extending first region and the axially extending second region, the spindle drive unit further comprising a bearing radially between the axially extending first region and the axially extending second region.

16. The spindle drive unit as recited in claim 3 wherein the intermediate plate contacts the rotor carrier and the lock nut.

* * * * *